(12) United States Patent
Hanna et al.

(10) Patent No.: US 6,269,175 B1
(45) Date of Patent: Jul. 31, 2001

(54) METHOD AND APPARATUS FOR ENHANCING REGIONS OF ALIGNED IMAGES USING FLOW ESTIMATION

(75) Inventors: Keith James Hanna, Princeton; Rakesh Kumar, Monmouth Junction; James Russell Bergen, Hopewell; Harpreet Singh Sawhney, W. Windsor, all of NJ (US); Jeffrey Lubin, New York, NY (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/384,118

(22) Filed: Aug. 27, 1999

Related U.S. Application Data

(60) Provisional application No. 60/098,368, filed on Aug. 28, 1998, and provisional application No. 60/123,615, filed on Mar. 10, 1999.

(51) Int. Cl.[7] .................................................. G06K 9/36
(52) U.S. Cl. ............................................. 382/107; 382/299
(58) Field of Search ................................. 382/107, 154, 382/254, 275, 284, 294, 299, 318

(56) References Cited

U.S. PATENT DOCUMENTS

| | | | |
|---|---|---|---|
| 4,683,496 | * 7/1987 | Tom | 358/166 |
| 4,924,521 | * 5/1990 | Dinan et al. | 382/54 |
| 5,657,402 | 8/1997 | Bender et al. | 382/284 |
| 5,680,487 | 10/1997 | Markandey | 382/291 |
| 5,696,848 | * 12/1997 | Patti et al. | 382/254 |
| 5,768,404 | 6/1998 | Morimura et al. | 382/107 |
| 5,949,914 | * 9/1999 | Yuen | 382/254 |
| 6,011,875 | * 1/2000 | Laben et al. | 382/276 |

FOREIGN PATENT DOCUMENTS

| | | | |
|---|---|---|---|
| 0 738 872 | 10/1996 | (EP) | G01C/11/06 |
| 0 915 433 | 5/1999 | (EP) | G04T/7/00 |

OTHER PUBLICATIONS

PCT International Search Report corresponding to PCT Application PCT/US99/19705.

* cited by examiner

*Primary Examiner*—Andrew W. Johns
(74) *Attorney, Agent, or Firm*—William J. Burke; John V. Silverio (57) ABSTRACT

A method and apparatus for accurately computing parallax information as captured by imagery of a scene. The method computes the parallax information of each point in an image by computing the parallax within windows that are offset with respect to the point for which the parallax is being computed. Additionally, parallax computations are performed over multiple frames of imagery to ensure accuracy of the parallax computation and to facilitate correction of occluded imagery.

6 Claims, 7 Drawing Sheets

METHOD AND APPARATUS FOR ENHANCING REGIONS OF ALIGNED IMAGES USING FLOW ESTIMATION

This application claims the benefit under 35 United States Code § 119 of United States Provisional Application No. 60/098,368, filed Aug. 28, 1998, and United States Provisional Application No. 60/123,615, filed Mar. 10, 1999. Both of which are hereby incorporated by reference in their entirety.

This application contains related subject matter to that of United States Patent Application No. 09/384,396, filed simultaneously herewith (Attorney Docket Number SAR 13165), and incorporated herein by reference in its entirety.

The invention relates to an image processing method and apparatus and, more particularly, the invention relates to a method and apparatus for enhancing the quality of an image.

BACKGROUND OF THE DISCLOSURE

For entertainment and other applications, it is useful to obtain high-resolution stereo imagery of a scene so that viewers can visualize the scene in three dimensions. To obtain such high-resolution imagery, the common practice of the prior art is to use two or more high-resolution devices or cameras, displaced from each other. The first high-resolution camera captures an image or image sequence, that can be merged with other high-resolution images taken from a viewpoint different than the first high-resolution camera, creating a stereo image of the scene.

However, creating stereo imagery with multiple high-resolution cameras can be difficult and very expensive. The number of high-resolution cameras used to record a scene can contribute significantly to the cost of producing the stereo image scene. Additionally, high-resolution cameras are large and unwieldy. As such, the high-resolution cameras are not easy to move about when filming a scene. Consequently, some viewpoints may not be able to be accommodated because of the size of the high-resolution cameras, thus limiting the viewpoints available for creating the stereo image.

Similarly, in other applications given a collection of captured digital imagery, the need is to generate enhanced imagery for monocular or binocular viewing Examples of such application are resolution enhancement of video and other digital imagery, quality enhancement in terms of enhanced focus, depth of field, color and brightness/contrast enhancement, and creation of synthetic imagery from novel viewpoints based on captured digital imagery and videos.

All the above applications involve combining multiple co-temporal digital sensors (camera for example) and/or temporally separated sensors for the purpose of creation of synthetic digital imagery. The various applications can be broadly divided along the following lines (but are not limited to these):

1. Creation of an enhanced digital image by processing one or more frames of imagery from cameras and or other sensors which have captured the imagery at the same time instant. The synthesized frame represents the view of an enhanced synthetic camera located at the position of one of the real sensors.
2. Creation of enhanced digital imagery by processing frames that have been captured over time and space (multiple cameras/sensors capturing video imagery over time). The synthesized frames represent enhanced synthetic cameras located at the position of one or more of the real sensors.
3. Creation of enhanced digital imagery by processing frames that have been captured over time and space (multiple cameras/sensors capturing video imagery over time). The synthesized frames represent enhanced synthetic cameras that are located at positions other than those of the real sensors.

Therefore, a need exists in the art for a method and apparatus for creating a synthetic high-resolution image and/enhancing images using only one high-resolution camera.

SUMMARY OF THE INVENTION

The disadvantages associated with the prior art are overcome by the present invention for a method and apparatus for accurately computing image flow information as captured by imagery of a scene. The invention computes the image flow information of each point in an image by computing the image flow within windows that are offset with respect to the point for which the image flow is being computed. Additionally, image flow computations are performed over multiple frames of imagery to ensure accuracy of the image flow computation and to facilitate correction of occluded imagery.

In one illustrative embodiment of the invention, the image flow computation is constrained to compute parallax information. The imagery and parallax (or flow) information can be used to enhance various image processing techniques such as image resolution enhancement, enhancement of focus, depth of field, color, and brightness. The parallax (or flow) information can also be used to generate a synthetic high-resolution image that can be used in combination with the original image to form a stereo image. Specifically, the apparatus comprises an imaging device for producing images (e.g., video frame sequences) and a scene sensing device for producing information regarding the imaged scene. An image processor uses the information from the scene sensing device to process the images produced by the imaging device. This processing produces parallax information regarding the imaged scene. The imagery from the imaging device and the parallax information can be used to enhance any one of the above-mentioned image processing applications.

The invention includes a method that is embodied in a software routine, or a combination of software and hardware. The inventive method comprises the steps of supplying image data having a first resolution and supplying image information regarding the scene represented by the image data. The image data and information are processed by, for example, warping the first image data to form a synthetic image having a synthetic view, where the viewpoint of the synthetic image is different from the viewpoint represented in the image data. The synthetic image and the original image can be used to compute parallax information regarding the scene. By using multiple frames from the original imagery and the synthetic view imagery, the inventive process improves the accuracy of the parallax computation.

Alternate embodiments of the invention include but are not limited to, utilizing multiple sensors in addition to the scene sensing device to provide greater amounts of scene data for use in enhancing the synthetic image, using a displacement device in conjunction with the second imaging device to create a viewpoint for the warped image that is at the location of the displacement device, and using a range finding device as the second imaging device to provide image depth information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
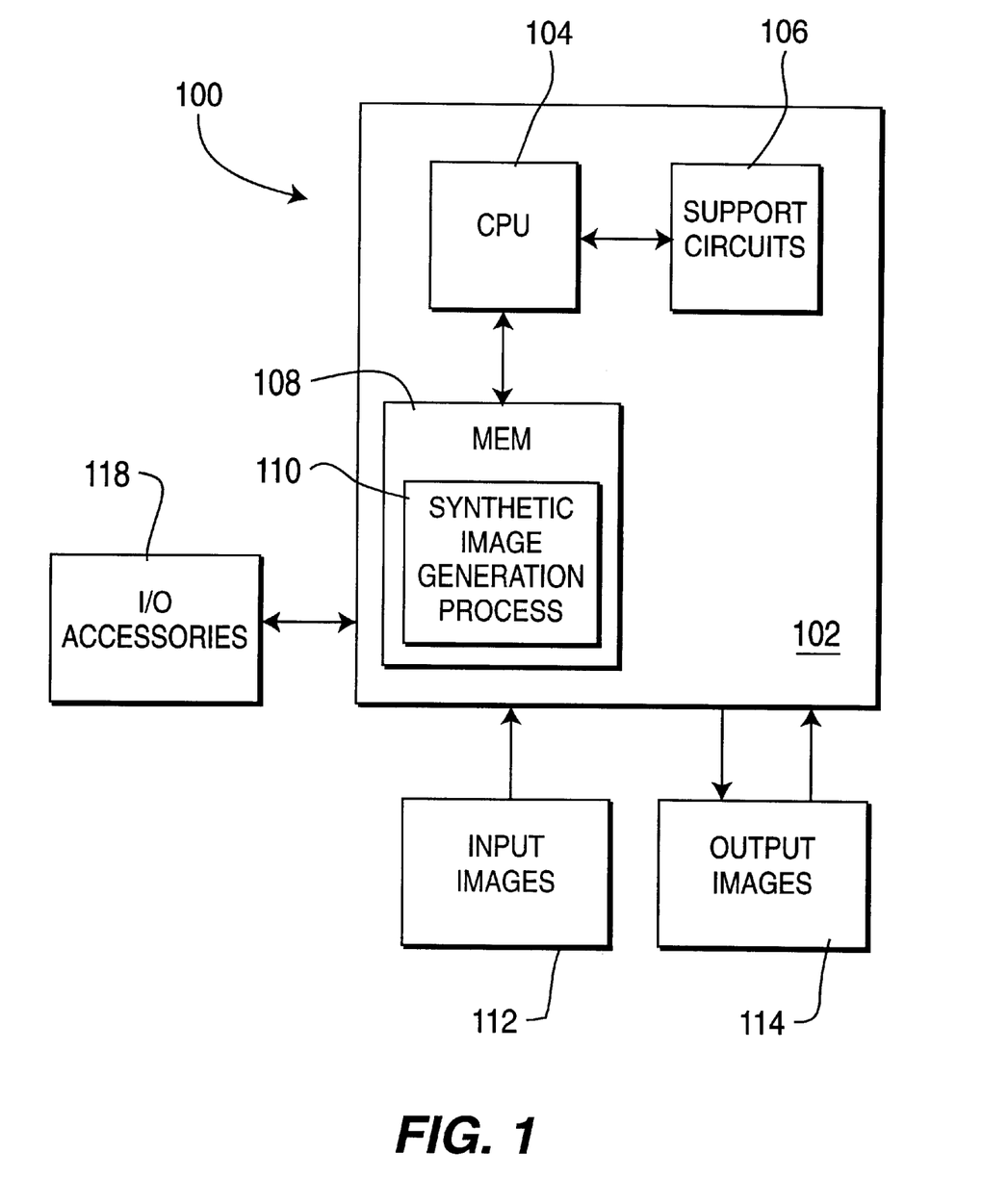
FIG. 1 depicts a block diagram of an imaging apparatus incorporating the image analysis method and apparatus of the invention.

FIG. 1 depicts a high-resolution synthetic image generation apparatus 100 of the present invention. An input video sequence 112 is supplied to a computer 102. The computer 102 comprises a central processing unit (CPU) 104, support circuits 106, and memory 108. Residing within the memory 108 is a high-resolution synthetic image generation routine 110. The high-resolution synthetic image generation routine 110 may alternately be readable from another source such as a floppy disk, CD, remote memory source or via a network. The computer additionally is coupled to input/output accessories 118. As a brief description of operation, an input video sequence 112 is supplied to the computer 102, which after operation of the high-resolution synthetic image generation routine 110, outputs a synthetic high-resolution image 114.

Figure 2:
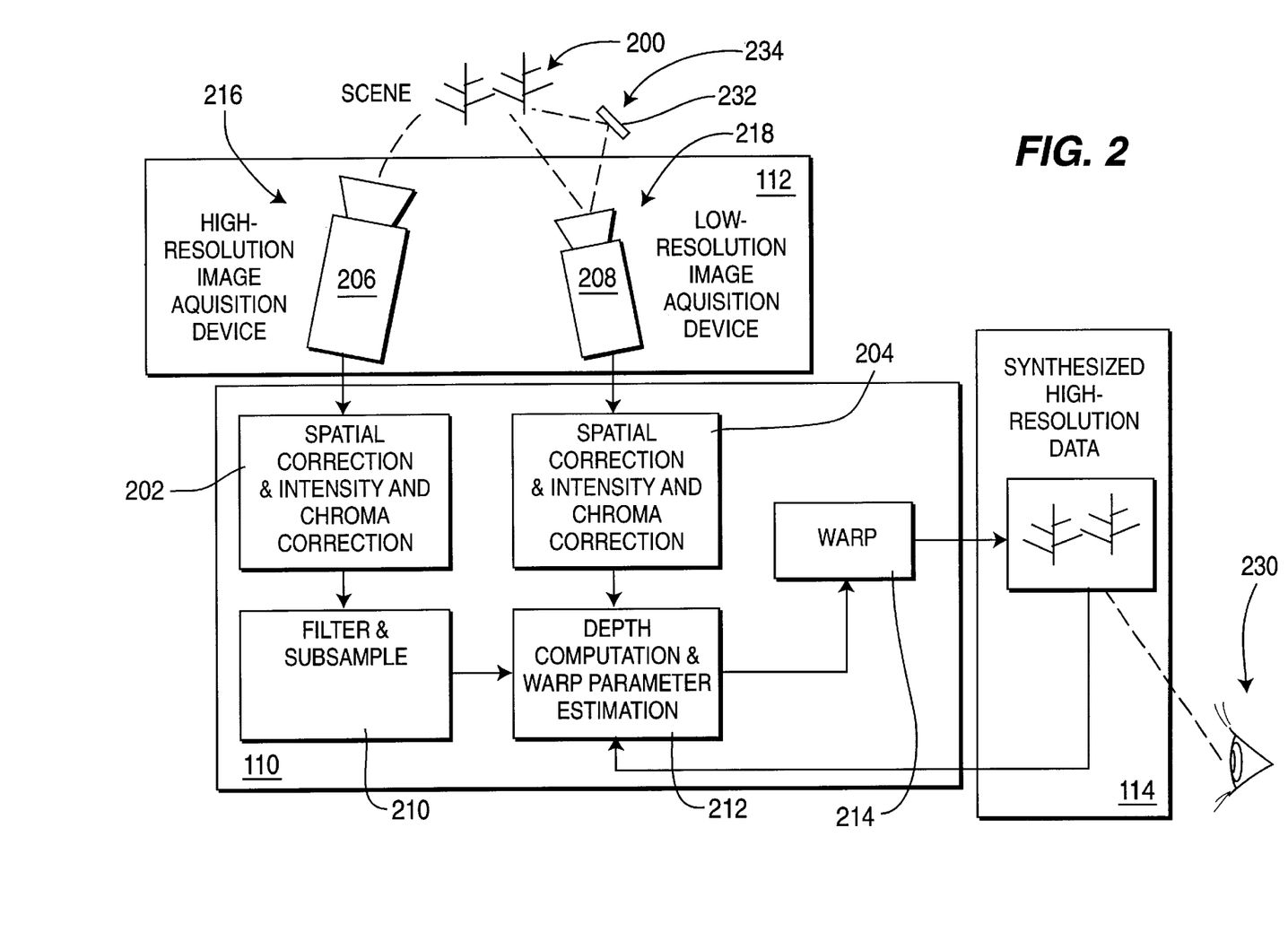
FIG. 2 depicts a block schematic of an imaging apparatus and an image analysis method used to produce one embodiment of the subject invention.

The high-resolution synthetic image generation routine 110 hereinafter referred to as the routine 110, can be understood in greater detail by referencing FIG. 2. Although the process of the present invention is discussed as being implemented as a software routine 110, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. Thus, the reader should note that each step of the routine 110 should also be construed as having an equivalent application specific hardware device (module), or hardware device used in combination with software.

The high-resolution synthetic image generation routine 110 of one illustrative embodiment of the invention receives the input 112 from a first image acquisition device 206 and a second image acquisition device 208. The first image acquisition device 206 views a scene 200 from a first viewpoint 216 while the second image acquisition device 208 views the scene 200 from a second viewpoint 218. The second viewpoint 218 may include the first viewpoint 216 (i.e., the first and second image acquisition devices 206 and 208 may view the scene 200 from the same position). Alternately, a displacement mechanism 232 (e.g., a mirror) positioned in a remote location 234 may be used to make the data captured by the second image acquisition device 208 appear as if the second image acquisition device 208 is positioned at the remote location 234. As such, the scene would be imaged by device 208 from the mirror 232 rather than directly. The first image acquisition device 206 has an image resolution higher than that of the second image acquisition device 208. The first image acquisition device 206 may comprise a number of different devices having a number of different data output formats, as one skilled in the art will readily be able to adapt the process described by the teachings herein to any number of devices and data formats and/or protocols. In one embodiment, the first image acquisition device 206 is a high-definition camera, i.e., a camera with a resolution of at least 8000 by 6000 pixels/cm$^2$. Similarly, the second image acquisition device 208 may also comprise a varied number of devices, since one skilled in the art can readily adapt the routine 110 to various devices as discussed above. In one embodiment, the second image acquisition device 206 is a camera having a resolution lower than the resolution of the high-resolution device, i.e., a standard definition video camera. For example, the high resolution imagery may have 8000 by 6000 pixels/cm$^2$ and the lower resolution image may have 1000 by 1000 pixels/cm$^2$.

The routine 110 receives input data from the first image acquisition device 206 and corrects the spatial, intensity and chroma distortions in step 202. The chroma distortions are caused by, for example, lens distortion. This correction is desired in order to improve the accuracy of subsequent steps executed in the routine 110. Methods are known in the art for computing a parametric function that describes the lens distortion function. For example, the parameters are recovered in step 202 using a calibration procedure as described in H. S. Sawhney and R. Kumar, True Multi-Image Alignment and its Application to Mosaicing and Lens Distortion, Computer Vision and Pattern Recognition Conference proceedings, pages 450–456, 1997, incorporated by reference in its entirety herein.

Additionally, step 202 also performs chromanence (chroma) and intensity corrections. This is necessary since image data from the second image acquisition device 208 is merged with data from the first image acquisition device 206, and any differences in the device response to scene color and intensity or due to lens vignetting, for example, results in image artifacts in the synthesized image 114. The correction is performed by pre-calibrating the devices (i.e., the first image acquisition device 206 and the second image acquisition device 208) such that the mapping of chroma and intensity from one device to the next is known. The measured chroma and intensity from each device is stored as look-up table or a parametric function. The look up table or parametric equation are then accessed to perform the chroma and intensity corrections in order to match the chroma and intensity of the other device.

Input data from the second image acquisition device 208 is also corrected for spatial, intensity and chroma distortions in step 204. The process for correcting the low-resolution distortions in step 204 follow the same process as the corrections performed in step 202.

To clarify, the chroma and intensity correction between the high resolution and low resolution imaging devices, or between multiple same resolution imaging devices, may also be performed by automatically aligning images based on parallax or temporal optical flow computation either in a pre-calibration step using fixed patterns or through an online computation as a part of the frame synthesis process. After aligning corresponding frames using the methods described below, regions of alignment and misalignment are labeled using a quality of alignment metric. By using pixels between two or more cameras that have aligned well, parametric transformations are computed that represent color and intensity transformations between the cameras. With the knowledge of each parametric transformation, the source color pixels can be transformed into the destination color pixels that completely match the original destination pixels.

The corrected high-resolution data from step 202 is subsequently filtered and subsampled in step 210. The purpose of step 210 is to reduce the resolution of the high-resolution imagery such that it matches the resolution of the low-resolution image. Step 210 is necessary since features that appear in the high-resolution imagery may not be present in the low-resolution imagery, and cause errors in a depth recovery process (step 306 detailed in FIG. 3 below). Specifically, these errors are caused since the depth recovery process 306 attempts to determine the correspondence between the high-resolution imagery and the low-resolution imagery, and if features are present in one image and not the other, then the correspondence process is inherently error-prone.

The step 210 is performed by first calculating the difference in spatial resolution between the high-resolution and low-resolution devices. From the difference in spatial resolution, a convolution kernel can be computed that reduces the high-frequency components in the high-resolution imagery such that the remaining frequency components match those components in the low-resolution imager. This can be performed using standard, sampling theory (e.g., see P. J. Burt and E. H. Adelson, The Laplacian Pyramid as a Compact Image Code, IEEE Transactions on Communication, Vol. 31, pages 532–540, 1983, incorporated by reference herein in its entirety).

For example, if the high-resolution and low-resolution imagery were different in spatial resolution by a factor of 2 vertically and horizontally, then an appropriate filter kernel is [1,4,6,4,1]/16. This filter is applied first vertically, then horizontally. The high-resolution image can then be subsampled by a factor of 2 so that the spatial sampling of the image data derived from the high-resolution imager matches that of the low-resolution imager.

Once the high-resolution image data has been filtered and subsampled in step 210, the parallax is computed in step 212 at each frame time to determine the relationship between viewpoint 216 and viewpoint 218 in the high-resolution and low-resolution data sets. More specifically, the parallax computation of step 212 computes the displacement of image pixels between the images taken from view point 216 and viewpoint 218 due to their difference in viewpoint of the scene 200.

The pair of images can be left and right images (images from viewpoints 216 and 218) to form a stereo pair captured at the same time instant, or a pair of images captured at two closely spaced time intervals, or two images at different time instants during which no substantial independent object motion has taken place. In any of these cases the parallax processing is accomplished using at least two images and, for more accurate results, uses many images, e.g., five.

Because this parallax information depends on the relationship between the at least two input images having different viewpoints (216 and 218, respectively) of a scene 200, it is initially computed at the spatial resolution of the lower resolution image. This is accomplished by resampling the high-resolution input image using an appropriate filtering and sub-sampling process, as described above in step 210.

Generally speaking, the resolution of the input images may be the same. This is a special case of the more general variable resolution case. The parallax computation techniques are identical for both the cases once the high resolution image has been filtered and subsampled to be represented at the resolution of the low resolution image.

The computation of step 212 is performed using more or less constrained algorithms depending on the assumptions made about the availability and accuracy of calibration information. In the uncalibrated extreme case, a two-dimensional flow vector is computed for each pixel in the to which alignment is being performed. If it is known that the epipolar geometry is stable and accurately known, then the computation reduces to a single value for each image point. The computation used to produce image flow information can be constrained to produce parallax information. The techniques described below can be applied to either the flow information or parallax information.

In many situations, particularly those in which parallax magnitudes are large, it is advantageous in step 212 to compute parallax with respect to some local parametric surface. This is method of computation is known as "plane plus parallax". The plane plus parallax representation can be used to reduce the size of per-pixel quantities that need to be estimated. For example, in the case where scene 200 comprises an urban scene with a lot of approximately planar facets, parallax may be computed in step 212 as a combination of planar layers with additional out-of-plane component of structure. The procedure for performing the plane plus parallax method is detailed in United State Patent Application No. 08/493,632, filed Jun. 22, 1995; R. Kumar et al., Direct Recovery of Shape From Multiple Views: A Parallax Based Approach, $12^{th}$ ICPR, 1994; Harpreet Sawhney, 3D Geometry From Planar Parallax, CVPR 94, June 1994; and A. Shashua and N. Navab, Relative Affine Structure, Theory and Application to 3D Construction From 2D Views, IEEE Conference on Computer Vision and Pattern Recognition, June 1994, all of which are hereby incorporated by reference.

Other algorithms are available that can perform parallax analysis in-lieu of the plane plus parallax method. These algorithms generally use a coarse-fine recursive estimation process using multiresolution image pyramid representations. These algorithms begin estimation of image displacements at reduced resolution and then refine these estimates through repeated warping and residual displacement estimation at successively finer resolution levels. The key advantage of these methods is that they provide very efficient computation even when large displacements are present but also provide sub-pixel accuracy in displacement estimates. A number of published papers describe the underlying techniques employed in the parallax computation of step 212. Details of such techniques can be found in U.S. Pat. No. 5,259,040, issued Nov. 2, 1993; J. R. Bergen et al., Hierarchical Model-Based Motion Estimation, $2^{nd}$ European Conference on Computer Vision, pages 237–252, 1992; K. J. Hanna, Direct Multi-Resolution Estimation of Ego-Motion and Structure From Motion, IEEE Workshop on Visual Motion, pages 15–162, 1991; K. J. Hanna and Neil E. Okamoto, Combining Stereo and Motion Analysis for Direct Estimation of Scene Structure, International Conference on Computer Vision, pages 357–356, 1993; R. Kumar et al., Direct Recovery of Shape from Multiple Views: A Parallax Based Approach, ICPR, pages 685–688, 1994; and S. Ayer and J. S. Sawhney, Layered Representation of Motion Video Using Robust Maximum-Likelihood Estimation of Mixture Models and MDL Encoding, International Conference on Computer Vision, pages 777–784, 1995, all of which are hereby incorporated by reference.

Although the step 212 can be satisfied by simply computing parallax using the plane plus parallax method described above, there are a number of techniques that can be used to make the basic two-frame stereo parallax computation of step 212 more robust and reliable. These techniques may be performed singularly or in combination to improve the accuracy of step 12. The techniques are depicted in the block diagram of FIG. 3 and comprise of augmentation routines 302, sharpening 304, routines that compute residual parallax 306, occlusion detection 308, and motion analysis 310.

Figure 3:
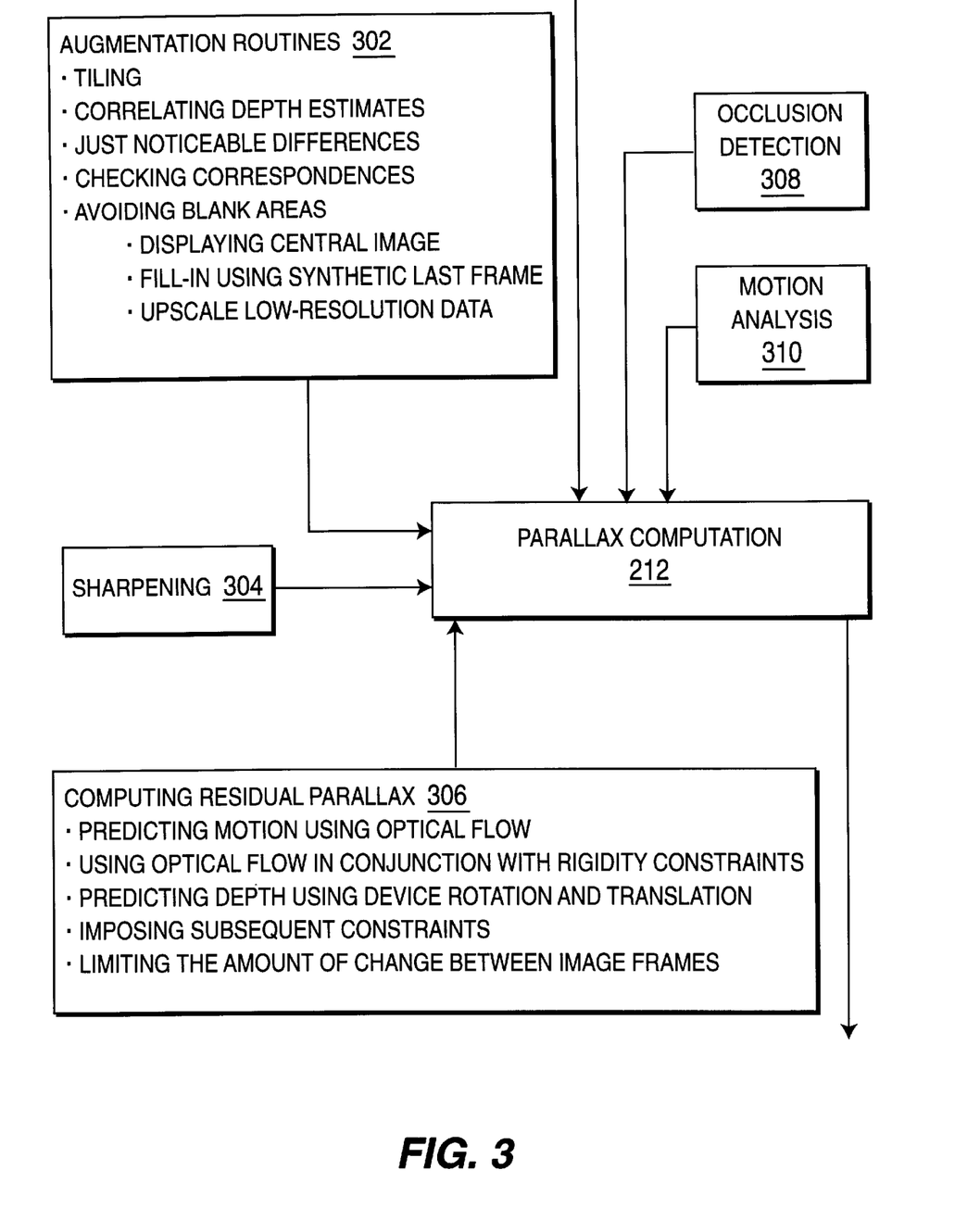
FIG. 3 is a flow chart of the parallax computation method.

The augmentation routines 302 make the basic two-frame stereo parallax computation robust and reliable. One approach divides the images into tiles and, within each tile, the parameterization is of a dominant plane and parallax. In particular, the dominant plane could be a frontal plane. The planar parameterization for each tile is constrained through a global rotation and translation (which is either known through pre-calibration of the stereo set up or can be solved for using a direct method).

Another augmentation routine 302 handles occlusions and textureless areas that may induce errors into the parallax computation. To process occlusions and textureless areas, depth matching across two frames is done using varying window sizes, and from coarse to fine spatial frequencies. A "window" is a region of the image that is being processed to compute parallax information for a point or pixel within the window. Multiple window sizes are used at any given resolution level to test for consistency of depth estimate and the quality of the correlation. Depth estimate is considered reliable only if at least two window sizes produce acceptable correlation levels with consistent depth estimates. Otherwise, the depth at the level which produces unacceptable results is not updated. If the window under consideration does not have sufficient texture, the depth estimate is ignored and a consistent depth estimate from a larger window size is preferred if available. Areas in which the depth remains undefined are labeled as such as to that they can be filled in either using preprocessing, i.e., data from the previous synthetic frame or through temporal predictions using the low-resolution data, i.e., up-sampling low-resolution data to fill in the labeled area in the synthetic image 114.

Figure 7:
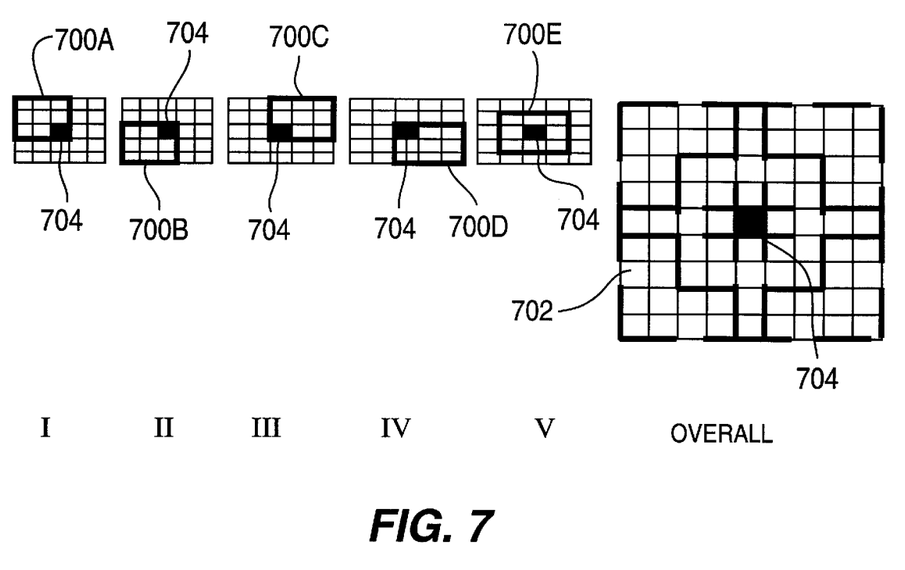
FIG. 7 depicts a schematic view of multiple offset windows as used to compute parallax at points within an image.

Multiple windows are defined in terms of their sizes as well as relative location with respect to the pixel/region for which depth/parallax estimation is performed. Windows are defined both as centered on the pixel for which depth/parallax is desired as well as off-centered windows. Along with selection of windows based on a consistent depth estimate, the selection is also accomplished on the basis of error in alignment; specifically windows that are used to compute parallax information that leads to a minimum alignment error and consistent depth estimates are selected as the parallax information for the point in the image. An illustration of the multi-window concept is shown in FIG. 7. FIG. 7 depicts an overall image region 702 that is being processed and a plurality of windows 700A, 700B, 700C, 700D, 700E used to process the image region. Each window 700 A–E contains the image point 704 for which the parallax information is being generated. Window 700E is centered on the point 704, while windows 700A–D are not centered on the point 704A (i.e., the windows are offset from the point 704). Parallax information is computed for each window 700A–E and the parallax information corresponding to the window having a minimum alignment error and consistent depth estimates is selected as the parallax information for the image point 704. The size and shape of the windows 700A–E are for illustrative purposes and do not cover all the possible window configurations that could be used to process the imagery. For example, windows not aligned with the coordinate axes (vertical and horizontal) are also used. In particular, these may be diagonal shaped windows.

An additional approach for employing an augmentation routine 302 is to use Just Noticeable Difference Models (JND) models in the optimization for depth estimation. For example, typically image measures such as intensity difference are used to quantify the error in the depth representation. However, these measures can be supplemented with JND measures that attempt to measure errors that are most visible to a human observer. The approach for employing JND methods are discussed in greater detail below.

An additional augmentation routine 302 provides an algorithm for computing image location correspondences. First, all potential correspondences at image locations are defined by a given camera rotation and translation at the furthest possible range, and then correspondences are continuously checked at point locations corresponding to successively closer ranges. Consistency between correspondences recovered between adjacent ranges gives a measure of the accuracy of the correspondence.

Another augmentation routine 302 avoids blank areas around the perimeter of the synthesized image. Since the high-resolution imagery is being warped such that it appears at a different location, the image borders of the synthesized image may not have a correspondence in the original synthesized image. Such areas may potentially be left blank. This problem is solved using three approaches. The first approach is to display only a central window of the original and high-resolution imagery, such that the problem area is not displayed. The second approach is to use data from previous synthesized frames to fill in the region at the boundary. The third approach is to filter and up-sample the data from the low-resolution device, and insert that data at the image boundary.

An additional augmentation routine 302 provides an algorithm that imposes global 3D and local (multi-) plane constraints Specifically, the approach is to represent flow between frame pairs as tiled parametric (with soft constraints across tiles) and smooth residual flow. In addition, even the tiles can be represented in terms of a small number of parametric layers per tile. In the case when there is a global 3D constraint across the two frames (stereo), then the tiles are represented as planar layers where within a patch more than one plane may exist.

Another method for improving the quality of the parallax computation of step 212 is to employ a sharpening routine 304. For example, in the neighborhood of range discontinuities or other rapid transitions, there is typically a region of intermediate estimated parallax due to the finite spatial support used in the computation process 212. Explicit detection of such transitions and subsequent "sharpening" of the parallax field minimize these errors. As an extension to this basic process, information from earlier (and potentially later) portions of the image sequence is used to improve synthesis of the high-resolution image 114. For example, image detail in occluded areas may be visible from the high-resolution device in preceding or subsequent frames. Use of this information requires computation of motion information from frame to frame as well as computation of parallax. However, this additional computation is performed as needed to correct errors rather than on a continual basis during the processing of the entire sequence.

Additionally, the parallax computation of step 212 can be improved by computing the residual parallax (depth) using a method described as follows or an equivalent method that computes residual parallax 306. One method monitors the depth consistency over time to further constrain depth/disparity computation when a motion stereo sequence is available as is the case, for example, with a hi-resolution still image. Within two images captured at the same time instant, a rigidity constraint is valid and is exploited in the two-frame computation of depth outlined above. For multiple stereo frames, optical flow is computed between the corresponding frames over time. The optical flow serves as a predictor of depth in the new frames. Within the new frames, depth computation is accomplished between the pair while being constrained with soft constraints coming from the predicted depth estimate. This can be performed forward and backwards in time. Therefore, any areas for which estimates are available at one time instant but not at another can be filled in for both the time instants.

Another method of computing residual parallax 306 is to use the optical flow constraint along with a rigidity constraint for simultaneous depth/disparity computation over multiple stereo pairs, i.e., pairs of images over time. In particular, if large parts of the scene 200 are rigid, then the temporal rigidity constraint is parameterized in the depth computation in exactly the same manner as the rigidity constraint between the two frames at the same time instant. When there may be independently moving components in the scene 200, the optical flow constraint over time may be employed as a soft constraint as a part of the multi-time instant depth computation.

Another method of computing residual parallax 306 is to constrain depth as consistent over time to improve alignment and maintain consistency across the temporal sequence. For example, once depth is recovered at one time instant, the depth at the next frame time can be predicted by shifting the depth by the camera rotation and translation recovered between the old and new frames. This approach can also be extended by propagating the location of identified contours or occlusion boundaries in time to improve parallax or flow computation.

In order to compute a consistent depth map in a given reference frame, multiple frames over time can be used. Regions of the scene that are occluded in one pair (with respect to the reference frame) are generally visible in another image pair taken at some other instant of time. Therefore, in the coordinate system of a reference frame, matching regions from multiple frames can be used to derive a consistent depth/parallax map.

An additional approach for computing residual parallax 306 is to directly solve for temporally smooth stereo, rather than solve for instantaneous depth, and impose subsequent constraints to smooth the result. This can be implemented using a combined epipolar and flow constraint. For example, assuming that previous synthesized frames are available, the condition imposed on the newly synthesized frame is that it is consistent with the instantaneous parallax computation and that it is smooth in time with respect to the previously generated frames. This latter condition can be imposed by making a flow-based prediction based on the previous frames and making the difference from that prediction part of the error term. Similarly, if a sequence has already been generated, then the parallax-based frame (i.e., the warped high-resolution image) can be compared with the flow based temporally interpolated frame. This comparison can be used either to detect problem areas or to refine the parallax computation. This approach can be used without making rigidity assumptions or in conjunction with a structure/power constraint. In this latter case, the flow-based computation can operate with respect to the residual motion after the rigid part has been compensated. An extension of this technique is to apply the planar constraint across frames along with the global rigid motion constraint across all the files in one frame.

An additional approach is to enhance the quality of imagery using multiple frames in order to improve parallax estimates, as well as to produce imagery that has higher visual quality. The approach is as follows:

* perform alignment over time using a batch of frames (11 is an example number of frames) using the optical flow approaches described above so that images are in the same coordinate system
* sort the intensities for the batch of frames
* Perform a SELECTION process. An example is rejecting the top 2 and the lowest 2 intensities in the sorted list at each pixel.
* Perform a COMBINATION process. An example is averaging the remaining pixels.

The result is a enhanced image. The approach can be extended so that the approach is performed on pre-filtered images, and not on the raw intensity images. An example of a pre-filter is an oriented band-pass filter, for example, those described in"Two-dimensional signal and image processing" by Jae Lim, 1990, published by Prentice-Hall, Engelwood Cliffs, N.J.

Additionally, a method of computing residual parallax 306 which avoids a potential problem with instability in the synthetic stereo sequence in three dimensional structure composed using the synthetic image 114 is to limit and amount of depth change between frames. To reduce this problem, it is important to avoid temporal fluctuations in the extracted parallax structure using temporal smoothing. A simple form of this smoothing can be obtained by simply limiting the amount of change introduced when updating a previous estimate. To do this in a systematic way requires inter-frame motion analysis as well as intra-frame parallax computation to be performed.

The multi-window approach described above for the parallax computation is also valid for flow and/or parallax computation over time. Essentially window selection is accomplished based on criterion involving consistency of local displacement vector (flow vector over time) and minimum alignment error between frame pairs as in the case of two-frame parallax/depth computation.

Occlusion detection 308 is helpful in situations in which an area of the view to be synthesized is not visible from the position of the high-resolution camera. In such situations, it is necessary to use a different source for the image information in that area. Before this can be done, it is necessary to detect that such a situation has occurred. This can be accomplished by comparing results obtained when image correspondence is computed bi-directionally. That is, in areas in which occlusion is not a problem, the estimated displacements from computing right-left correspondence and from computing left-right correspondence agree. In areas of occlusion, they generally do not agree. This leads to a method for detecting occluded regions. Occlusion conditions can also be predicted from the structure of the parallax field itself. To the extent that this is stable over time areas of likely occlusion can be flagged in the previous frame. The bi-directional technique can then be used to confirm the condition.

Areas of occlusion and more generally areas of mismatch between an original frame and a parallax/flow-warped frame are detected using a quality-of-alignment measure applied to the original and warped frames. One method for generating such a measure is through normalized correlation between the pair of frames. Areas of low variance in both the frames are ignored since they do not affect the warped frame. Normalized correlation is defined over a number of different image representations some of which are: color, intensity, outputs of oriented and scaled filters.

Motion analysis 310 also improves the parallax computation of step 212. Motion analysis 310 involves analyzing frame-to-frame motion within the captured sequence. This information can be used to solve occlusion problems because regions not visible at one point in time may have been visible (or may become visible) at another point in time. Additionally, the problem of temporal instability can be reduced by requiring consistent three-dimensional structure across several frames of the sequence.

Analysis of frame-to-frame motion generally involves parsing the observed image change into components due to viewpoint change (i.e., camera motion), three dimensional structure and object motion. There is a collection of techniques for performing this decomposition and estimating the respective components. These techniques include direct camera motion estimation, motion parallax estimation, simultaneous motion and parallax estimation, and layer extraction for representation of moving objects or multiple depth surfaces. A key component of these techniques is the "plane plus parallax" representation. In this approach, parallax structure is represented as the induced motion of a plane (or other parametric surface) plus a residual per pixel parallax map representing the variation of induced motion due to local surface structure. Computationally, the parallax estimation techniques referred to above are essentially special cases of motion analysis techniques for the case in which camera motion is assumed to be given by the fixed stereo baseline.

Once the parallax field has been computed in step 212, it is used to produce the high-resolution synthesized image 114 in a warping step 214. The reader is encouraged to simultaneously refer to FIG. 2 and FIG. 4 for the best understanding of the warping step 214.

Figure 4:
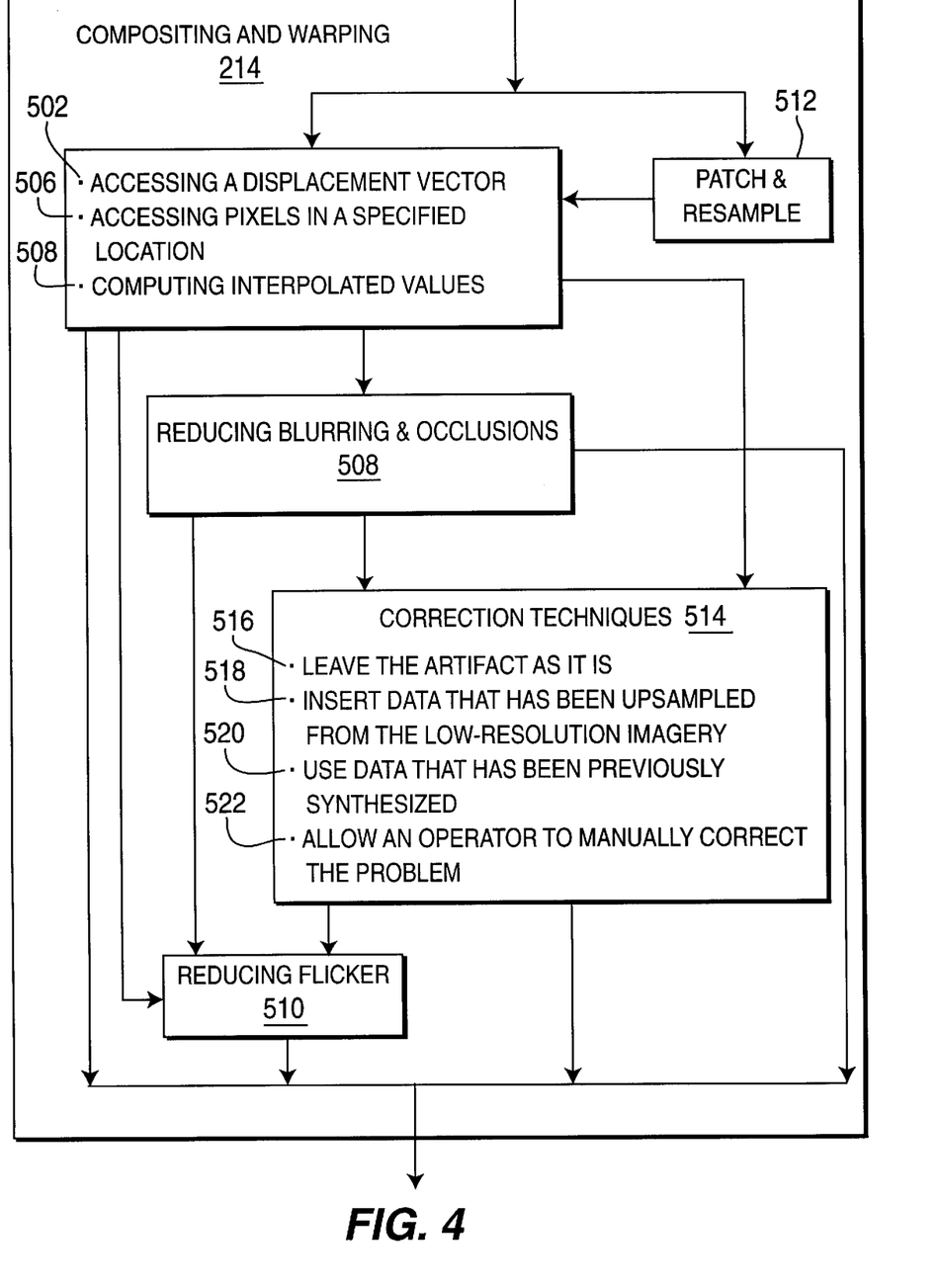
FIG. 4 is a flow chart of the image warping method.

Conceptually the process of warping involves two steps: parallax interpolation and image warping. In practice these two steps are usually combined into one operation as represented by step 214. In either case, for each pixel in the to-be-synthesized image, the computation of step 214 involves accessing a displacement vector specifying a location in the high-resolution source image from the first image acquisition device 206 (step 502), accessing the pixels in some neighborhood of the specified location and computing, based on those pixels (step 504), an interpolated value for the synthesized pixels that comprise the synthetic image 114 (step 506). Step 214 should be performed at the full target image resolution. Also, to preserve the desired image quality in the synthesized image 114, the interpolation step 506 should be done using at least a bilinear or bicubic interpolation function. The resultant synthesized image 114 has an apparent viewpoint 230. The apparent viewpoint 230 may be chosen by the user to comprise all viewpoints other than the first viewpoint 216.

Even more effective warping algorithms can make use of motion, parallax, other information (step 508). For example, the location of depth discontinuities from the depth recovery process can be used to prevent spatial interpolation in the warping across such discontinuities. Such interpolation can cause blurring in such regions. In addition, occluded areas can be filled in with information from previous or following frames using flow based warping. The technique described above in the discussion of plane plus parallax is applicable for accomplishing step 508.

Also, temporal scintillation of the synthesized imagery can be reduced using flow information to impose temporal smoothness (step 510). This flow information can be both between frames in the synthesize sequence, as well as between the original and synthesized imagery. Scintillation can also be reduced by adaptively peaking pyramid-based appearance descriptors for synthesized regions with the corresponding regions of the original high resolution frames. These can be smoothed over time to reduce "texture flicker."

Figure 8:
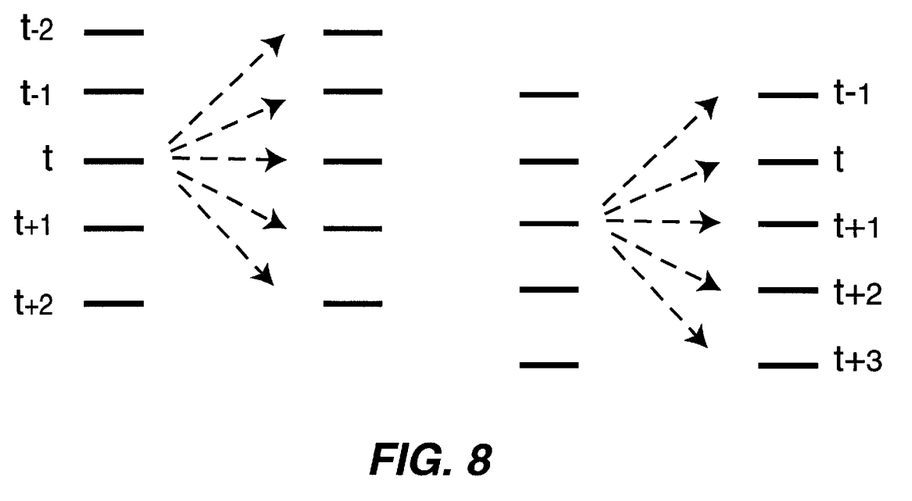
FIG. 8 depicts an illustration for a process to compute a quality measure for parallax computation accuracy.

Temporal flicker in the synthesized frames is avoided by creating a synthesized frame from a window of original resolution frames rather than from just one frame. For example for the high resolution image synthesis application, a window of, for example, five frames is selected. Between the stereo image pair involving the current low resolution and high resolution frames, parallax/depth based correspondences are computed as described above. Furthermore, between the current low resolution and previous and future high resolution frames within the window generalized flow and parallax based correspondences are computed (again as described above). Given the multiple correspondence maps between the current low resolution frame and the five high resolution frames within the window, quality of alignment maps are computed for each pair of low resolution/high resolution frames. Subsequently, a synthetic high resolution frame is synthesized by compositing the multiple high resolution frames within the window after warping these with their corresponding correspondence maps. The compositing process uses weights that are directly proportional to the quality of alignment at every pixel and the distance of the high resolution frame in time from the current frame. Further off frames are given lesser weight than the closer frames.

$$I(p;t) = \frac{\sum_{t_k} w_c(p;t_k) w_t(t_k)^w}{\sum_{t_k} w_c(p;t_k) w_t(t_k)}$$

where $w_c(p;t_k)$ is the quality-of-alignment weight between frames t and $t_k$ (this variable is set to zero if the quality measure is below a pre-defined threshold); and $w_t(t_k)$ is a weight that decreases as a function of time away from frame t. Any pixels that are left unfilled by this process are filled from the original (upsampled) frame as described above. An illustration of the concept of temporal windows is shown in FIG. 8.

For the video enhancement application, the same method can be applied to combine frames over time. Correspondences over time are established using flow estimation as described above. Multiple frames are then combined by quality weighted averaging as above.

Temporal flicker is also reduced using the constraint that regions of error are typically consistent over time. For example, an occlusion boundary between two frames is typically present in subsequent frames, albeit in a slightly different image location. The quality of alignment metric can be computed as described above and this quality metric itself can be tracked over time in order to locate the movement of problematic regions such as occlusion boundaries. The flow estimation method described above can be used to track the quality metric and associated occlusion boundaries. Once these boundaries have been aligned, the compositing result computed above can be processed to reduce flicker. For example the compositing result can be smoothed over time.

The warping step 214 can also be performed using data collected over an image patch, rather than just a small neighborhood of pixels. For example, the image can be split up into a number of separate regions, and the resampling is performed based on the area covered by the region in the target image (step 512).

The depth recovery may not produce completely precise depth estimates at each image pixel. This can result in a difference between the desired intensity or chroma value and the values produced from the original high-resolution imagery. The warping module can then choose to select one or more of the following options as a depth recovery technique (step 514), either separately, or in combination:

leave the artifact as it is (step 516)

insert data that has been upsampled from the low-resolution imagery (step 518)

use data that has been previously synthesized (step 520)

allow an operator to manually correct the problem (step 522).

A Just Noticeable Difference (JND) technique can be used for selecting the appropriate combination of choices. The JND measures performed on the synthesized sequence, and comparing the difference between a low-resolution form of the synthesized data and data from the low-resolution camera. Various JND measures are described in U.S. patent application Ser. Nos. 09/055,076, filed Apr. 3, 1989, 08/829,540, filed Mar. 28, 1997, 08/829,516, filed Mar. 28, 1997, and 08/828,161, filed Mar. 28, 1997 and U.S. Pat. Nos 5,738,430 and 5,694,491, all of which are incorporated herein by reference in their entireties. Additionally, the JND can be performed between the synthesized high-resolution image data, and the previous synthesized high-resolution image after being warped by the flow field computed from the parallax computation in step 212.

Figure 5:
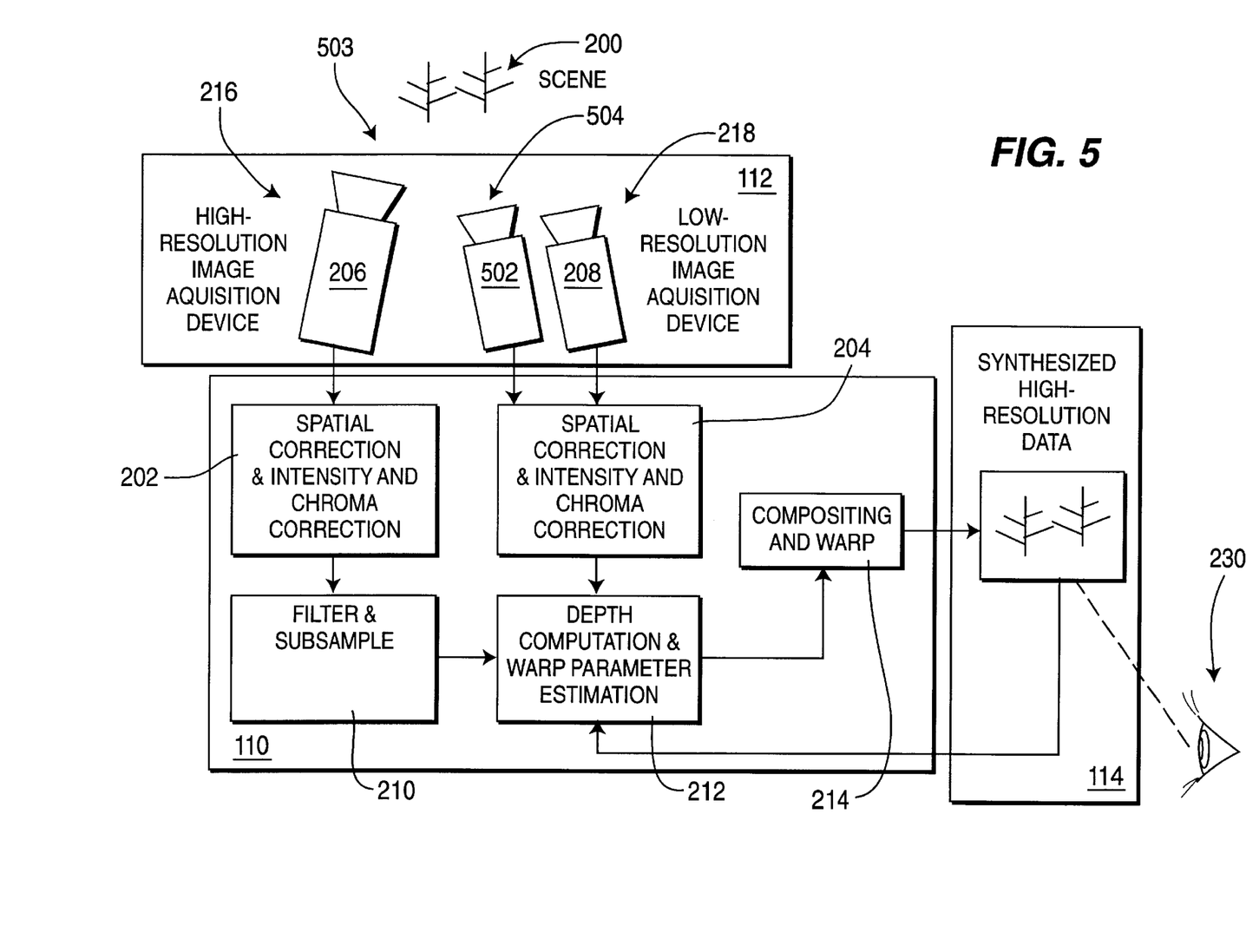
FIG. 5 depicts a block diagram of an imaging apparatus and an image analysis method used to produce a second embodiment of the subject invention.

Depicted in FIG. 5 is a second embodiment of the routine 110. The routine 110 receives the input 112 from a plurality of image acquisition devices 503 comprising the first image acquisition device 206, the second image acquisition device 208 and a third low-resolution image acquisition device 502. Additional low resolution image acquisition devices may be added as needed. The first, second and third image acquisition devices, 206, 208 and 502, view the scene 200 respectively from a first viewpoint 216, a second viewpoint 218 and a third viewpoint 504. The routine 110 receives processes the input data from the image acquisition devices, 206, 208 and 502 as discussed above with reference to steps 202, 204, 210, 212 and 214. The additional image(s) received from the at least third image acquisition device 502 provides data that is used in concert with the data received from the second image acquisition device 208 during the parallax computation step 212 and the warping step 214 to enhance the quality of the synthetic image 114, particularly the ability to place the apparent viewpoint 230 in locations not containing one of the image acquisition devices (i.e., the greater number of image acquisitions devices used results in having more lower-resolution data available to interpolate and fill in occluded or textureless areas in the synthesized image).

Figure 6:
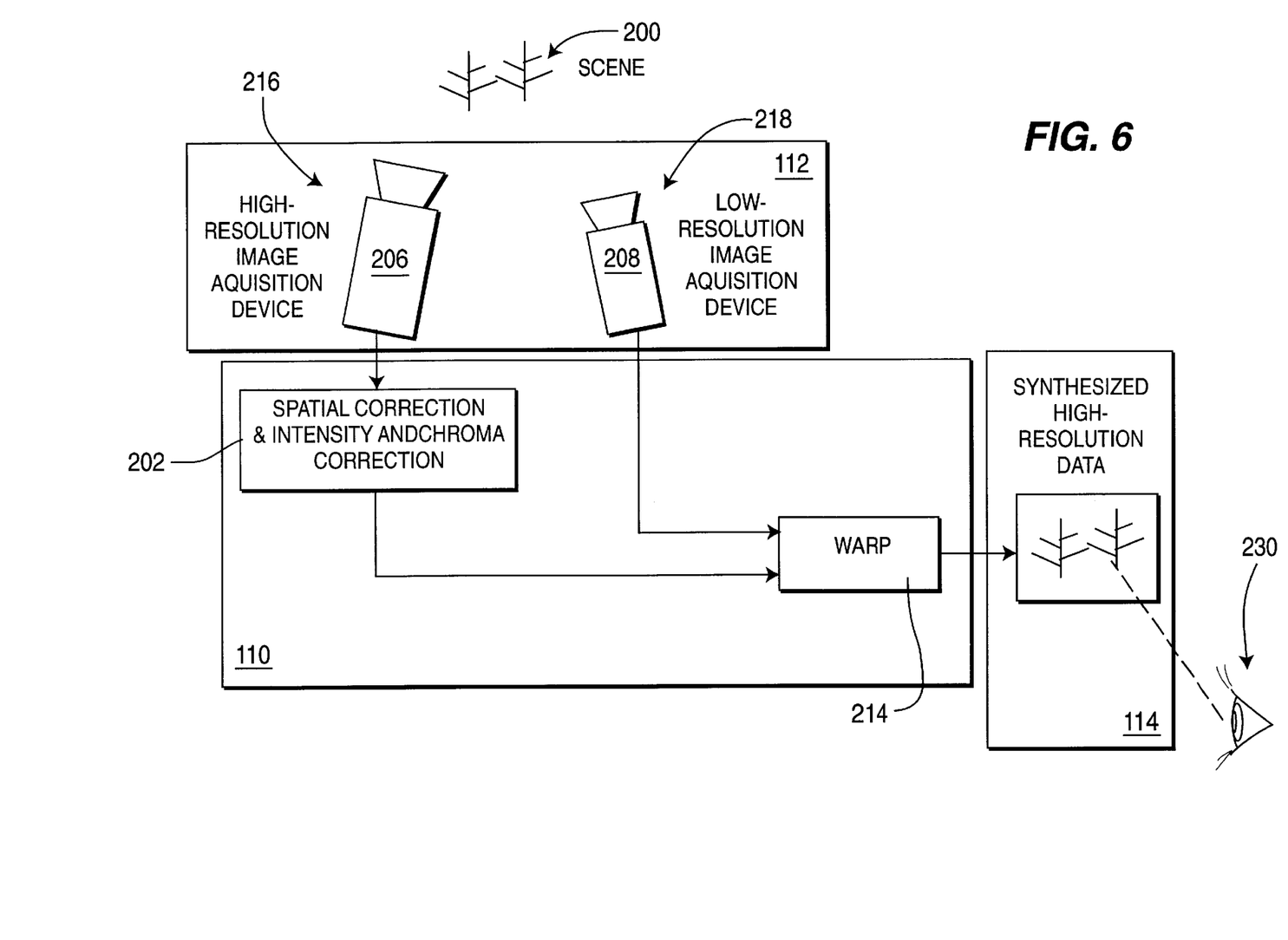
FIG. 6 depicts a block diagram of an imaging apparatus and an image analysis method used to produce a third embodiment of the subject invention.

A third embodiment of the routine 110 can be understood in greater detail by referencing FIG. 6. The routine 110, receives the input 112 from the first image acquisition device 206 and the second image acquisition device 208 wherein the low-resolution image acquisition device captures range data, for example, a laser range finder. The first image acquisition device 206 views the scene 200 from a first viewpoint 216 while the second image acquisition device 208 views the scene 200 from a second viewpoint 218. The routine 110 receives input data from the first image acquisition device 206 and corrects the spatial, intensity and chroma distortions in step 202 as discussed above.

After the high-resolution data has been corrected in step 202, the warping step 214 creates the synthesized image 114 by using the range (depth) data acquired from the second image acquisition device 208. The warping step 214 again is performed as discussed above.

Although the embodiment which incorporate the teachings of the present invention have been shown and described in detail herein, those skilled in the art can readily devise many other varied embodiments that still incorporate these teachings and spirit of the invention.

What is claimed is:

1. A method for enhancing regions within a plurality of images comprising:

aligning a plurality of images to form a plurality of aligned images;

computing a flow estimation for each of said aligned images;

identifying said flow estimation having the lowest error;

identifying, in response to said identified flow estimation, regions in a first aligned image; and enhancing said regions in said first aligned image with information from at least one other aligned image.

2. The method of claim 1 wherein said identified flow estimation is constrained to form a parallax estimation.

3. The method of claim 1 wherein computing step further comprises:

computing an epipolar constraint for each of said aligned images; and computing a flow field representing image changes from aligned image to aligned image.

4. The method of claim 1 wherein said computing step further comprises the step of:

computing a temporal constraint.

5. The method of claim 1 further comprising the steps of:

computing a flow estimation for a second aligned image; and using the flow estimation from said second aligned image to correct a flow estimation for said first aligned image.

6. The method of claim 1 wherein said region is caused by noise and said enhancing said step reduces said noise.

* * * * *